United States Patent
Ando et al.

(10) Patent No.: US 7,681,964 B2
(45) Date of Patent: Mar. 23, 2010

(54) RECORDING MEDIUM PROCESSING APPARATUS, PRINTING METHOD, AND COMPUTER PROGRAM

(75) Inventors: Makoto Ando, Tokyo (JP); Tatsumi Ito, Tokyo (JP); Koji Ashizaki, Tokyo (JP); Takahiro Toyoda, Tokyo (JP); Minoru Takeda, Tokyo (JP); Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 11/732,781

(22) Filed: Apr. 4, 2007

(65) Prior Publication Data
US 2007/0247479 A1    Oct. 25, 2007

(30) Foreign Application Priority Data
Apr. 6, 2006   (JP)   ............................. 2006-105243

(51) Int. Cl.
*B41J 3/00* (2006.01)
(52) U.S. Cl. .................................. 347/2; 347/3; 347/5
(58) Field of Classification Search ...................... 347/2, 347/3, 5, 9, 14, 19
See application file for complete search history.

(56) References Cited

U.S. PATENT DOCUMENTS

| 6,264,295 B1 * | 7/2001 | Bradshaw et al. | ............... 347/2 |
| 2004/0252142 A1 * | 12/2004 | Struk et al. | .................... 347/2 |

FOREIGN PATENT DOCUMENTS

JP    11-134648    5/1999

* cited by examiner

*Primary Examiner*—Lam S Nguyen
(74) *Attorney, Agent, or Firm*—Wolf, Greenfield & Sacks, P.C.

(57) ABSTRACT

A recording medium processing apparatus is disclosed. The recording medium processing apparatus includes: a head unit which traces a track formed on a recording surface of a recording medium and reads a data signal; a signal processing unit which detects positional information of the recording medium on the basis of the data signal; and a printing unit which prints visible information on a non-recording surface of the recording medium by referring to the positional information.

6 Claims, 16 Drawing Sheets

100

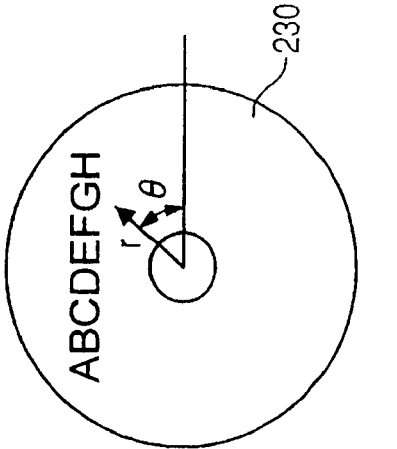
FIG. 6C
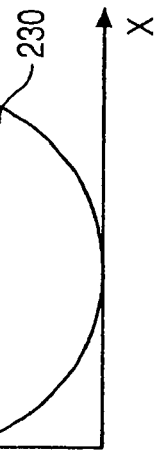
FIG. 6B
FIG. 6A

FIG. 10

State 1 and State 2

| Primary SYNC codes | Secondary SYNC codes |
|---|---|
| (msb) (lsb) | (msb) (lsb) |
| SY0 = 0001001001000100 0000000000010001 / 0001001000000100 0000000000010001 |
| SY1 = 0000010000000100 0000000000010001 / 0000010001000100 0000000000010001 |
| SY2 = 0001000000000100 0000000000010001 / 0001000001000100 0000000000010001 |
| SY3 = 0000100000000100 0000000000010001 / 0000100001000100 0000000000010001 |
| SY4 = 0010000000000100 0000000000010001 / 0010000001000100 0000000000010001 |
| SY5 = 0010001001000100 0000000000010001 / 0010001000000100 0000000000010001 |
| SY6 = 0010100100000100 0000000000010001 / 0010100101000100 0000000000010001 |
| SY7 = 0010100010000100 0000000000010001 / 0010100011000100 0000000000010001 |

State 3 and State 4

| Primary SYNC codes | Secondary SYNC codes |
|---|---|
| (msb) (lsb) | (msb) (lsb) |
| SY0 = 1001001000000100 0000000000010001 / 1001001001000100 0000000000010001 |
| SY1 = 1000010001000100 0000000000010001 / 1000010000000100 0000000000010001 |
| SY2 = 1001000001000100 0000000000010001 / 1001000000000100 0000000000010001 |
| SY3 = 1000001001000100 0000000000010001 / 1000001000000100 0000000000010001 |
| SY4 = 1000100001000100 0000000000010001 / 1000100000000100 0000000000010001 |
| SY5 = 1000100100000100 0000000000010001 / 1000100101000100 0000000000010001 |
| SY6 = 1001000010000100 0000000000010001 / 1001000011000100 0000000000010001 |
| SY7 = 1000100010000100 0000000000010001 / 1000100011000100 0000000000010001 |

RECORDING MEDIUM PROCESSING APPARATUS, PRINTING METHOD, AND COMPUTER PROGRAM

CROSS REFERENCES TO RELATED APPLICATIONS

The present invention contains subject matter related to Japanese Patent Application JP 2006-105243 filed in the Japanese Patent Office on Apr. 6, 2006, the entire contents of which are incorporated herein by reference.

BACKGROUND OF THE INVENTION

1. Field of the Invention

The present invention relates to a recording medium processing apparatus used for printing visible information on a non-recording surface of a recording medium, a printing method, and a computer program.

2. Description of Related Art

Recently, as a media for recording a video or audio in a digital form, an optical disc which is a recoding medium comes into wide use. In particular, since information (visible information) on contents recorded on an optical disc can be displayed on the surface of the disc, the optical disc including a printing surface (label surface) on which information can be printed by an inkjet printer is attracting attention.

As an apparatus for printing the visible information on the optical disc, there is, for example, an optical recording/reproducing apparatus having a printing function (see JP-A-11-134648). In the optical recording/reproducing apparatus, when visible information is printed while an optical disc rotates by a spindle motor, the print position of the visible information is adjusted while detecting the rotation angle of the optical disc, which is represented relative to the rotation angle of the spindle motor, using a rotary encoder attached to the spindle motor.

Meanwhile, a technology of recording a dedicated signal for detecting a rotation angle on an optical disc and providing a dedicated sensor for detecting the signal is suggested.

SUMMARY OF THE INVENTION

However, since a relationship between the rotation angle of the optical disc and the rotation angle of the spindle motor varies whenever the optical disc is attached or detached, the absolute rotation angle of the optical disc may not be detected in the known optical recording/reproducing apparatus. Accordingly, the known optical recording/reproducing apparatus may not recognize a non-print region of the optical disc, on which visible information is previously printed, and additionally record new visible information on the non-print region. It is troublesome that the dedicated signal or sensor for detecting the rotation angle is provided.

Accordingly, there is a need for a new or improved recording medium processing apparatus, a printing method, and a computer program, which are capable of printing visible information with high precision while detecting the absolute positional information of a recoding medium in real time, without recording a dedicated signal on the recording medium.

According to an embodiment of the present invention, there is provided a recording medium processing apparatus including: a head unit which traces a track formed on a recording surface of a recording medium and reads a data signal; a signal processing unit which detects positional information of the recording medium on the basis of the data signal; and a printing unit which prints visible information on a non-recording surface of the recording medium on the basis of the positional information. By this configuration, the printing unit can print the visible information on the non-recording surface by referring to the absolute positional information of the recording medium detected by the signal processing unit in real time.

The signal processing unit may include a clock generation unit which generates a reproduction clock on the basis of the data signal; a counter which counts the reproduction clock; and a position detection unit which detects positional information of the recording medium from the value of the counter. The frequency of the reproduction clock has higher precision than a pulse frequency generated by a rotary encoder or a frequency for detecting the address information. Accordingly, the counter can count the reproduction clock and the position detection unit can detect the high-precision positional information from the count value.

The clock generation unit may generate the reproduction clock on the basis of a synchronization signal included in the data signal. By this configuration, the clock generation unit can generate a stable high-precision reproduction clock on the basis of the synchronization signal which is periodically included in the data signal with high precision.

The signal processing unit may further include an address detection unit which detects address information of physical sectors of the track; and a reset signal generation unit which resets the value of the counter when the address information is a predetermined value. By this configuration, it is possible to detect the positional information of the recording medium on the basis of a current count value and a value counted until the counter is reset.

The track may be formed in a spiral shape and the head unit may track-jump to an inner circumference side when reaching a predetermined jump position of the track. By this configuration, since the distance in the radial direction of the track traced by the head unit is maintained to be substantially uniform, the read velocity of the data signal and the period of the reproduction clock generated by the clock generation unit can be maintained to be substantially uniform.

The clock generation unit may maintain the generation of the reproduction clock generated up to that time in a predetermined period after the head unit starts the track jump. By this configuration, it is possible to generate a normal reproduction clock during and after the track jump in which the reproduction clock is likely to be distorted.

The clock generation unit may detect the period of the synchronization signal and maintain the generation of the reproduction clock generated up to that time in a period when the synchronization signal is determined to be abnormal. By this configuration, it is possible to generate a normal reproduction clock in the period when the synchronization signal is determined to be abnormal as well as during and after the track jump.

According to another embodiment of the present invention, there is provided a printing method including the steps of: at a head unit, tracing a track formed on a recording surface of a recording medium and reading a data signal; generating a reproduction clock on the basis of the data signal; counting the reproduction clock; detecting address information of physical sectors of the track; allowing the head unit to track jump to an inner circumference side when the head unit reaches a predetermined jump position; resetting the count value when the address information is a predetermined value; detecting positional information of the recording medium from the value of the counter; and printing visible information on a non-recording surface of the recording medium on the basis of the positional information.

By this configuration, since the distance in the radial direction of the track traced by the head unit can be maintained to be substantially uniform, the read velocity of the data signal and the period of the generated reproduction clock can be maintained to be substantially uniform. It is possible to print the visible information on the non-recording surface by referring to the absolute positional information of the recording medium in real time.

According to a further embodiment of the present invention, there is provided a computer program for allowing a computer to function as a recording medium processing apparatus, the apparatus including: a head unit which traces a track formed on a recording surface of a recording medium and reads a data signal; a clock generation unit which generates a reproduction clock on the basis of the data signal; a counter which counts the reproduction clock; an address information detection unit which detects address information of physical sectors of the track; a drive control unit which allows the head unit to track jump to an inner circumference side when the head unit reaches a predetermined jump position; a reset signal generation unit which generates the reset signal which resets the count value when the address information is a predetermined value; a position detection unit which detects positional information of the recording medium from the value of the counter; and a printing unit which prints visible information on a non-recording surface of the recording medium on the basis of the positional information.

By this configuration, since the distance in the radial direction of the track traced by the head unit can be maintained to be substantially uniform, the read velocity of the data signal and the period of the reproduction clock generated by the clock generation unit can be maintained to be substantially uniform. It is possible to print the visible information on the non-recording surface by referring to the absolute positional information of the recording medium in real time.

As described above, in a recording medium processing apparatus, a printing method and a computer program according to the embodiments of the present invention, it is possible to print visible information with high precision while detecting the absolute positional information of a recording medium in real time, without recording a dedicated signal on the recording medium.

BRIEF DESCRIPTION OF THE DRAWINGS

FIGS. 6A to 6C are views showing a polar coordinate conversion process.

FIG. 10 is a view showing the configuration of a synchronization pattern.

DETAILED DESCRIPTION OF PREFERRED EMBODIMENTS

Figure 1:
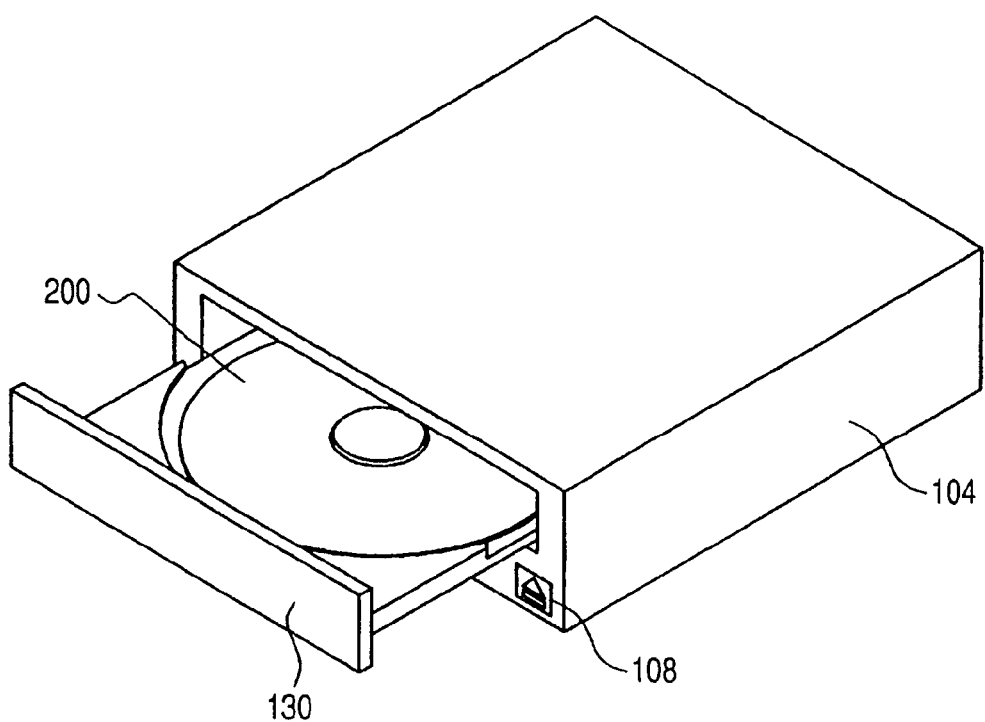
FIG. 1 is an appearance diagram showing an optical disc apparatus according to an embodiment of the present invention.

Embodiments of the present invention will be described in detail with reference to the attached drawings. In the present specification and drawings, components having substantially same functions are denoted by same reference numerals and the duplicated description thereof will be omitted.

First Embodiment

First, an optical disc apparatus according to a first embodiment of the present invention will be described.

FIG. 1 is an appearance diagram showing an optical disc apparatus 100 as a recording medium processing apparatus according to an embodiment of the present invention. The optical disc apparatus 100 includes a housing 104, an opening/closing switch 108, and a tray 130. In the shown example, an optical disc 200 which is a recoding medium is mounted in the optical disc apparatus 100.

The housing 104 covers the internal configuration of the optical disc apparatus 100 and protects the configuration from external factors such as the attachment of extraneous materials including dust or the flow of air. The housing 104 has a rectangular parallelepiped in the shown example, but may have a cylindrical shape. When the optical disc apparatus 100 is mounted in an information processing apparatus such as a personal computer (PC) or a recorder, the housing 104 may be omitted.

The opening/closing switch 108 is provided, for example, on the front surface of the housing 104 and performs the opening/closing operation of the tray 130 when a user presses the opening/closing switch 108. The tray 130 has a shape capable of mounting the optical disc 200 such that the user is allowed to attach/detach the optical disc 200 by the opening/closing operation. When the optical disc apparatus 100 is mounted in the information processing apparatus such as the PC or the recorder, the tray 130 may be opened/closed according to an opening/closing instruction from the PC or the recorder.

The recording medium is not limited to the optical disc 200 and may be a recording medium such as a magnetic disc, an optical magnetic disc, and a flash memory. According to the type of the recording medium, the recording medium processing apparatus may be a magnetic disc apparatus or an optical magnetic disc apparatus for recording/reproducing data on/from the recording medium.

Next, the internal configuration of the optical disc apparatus 100 according to the present embodiment will be described.

Figure 2:
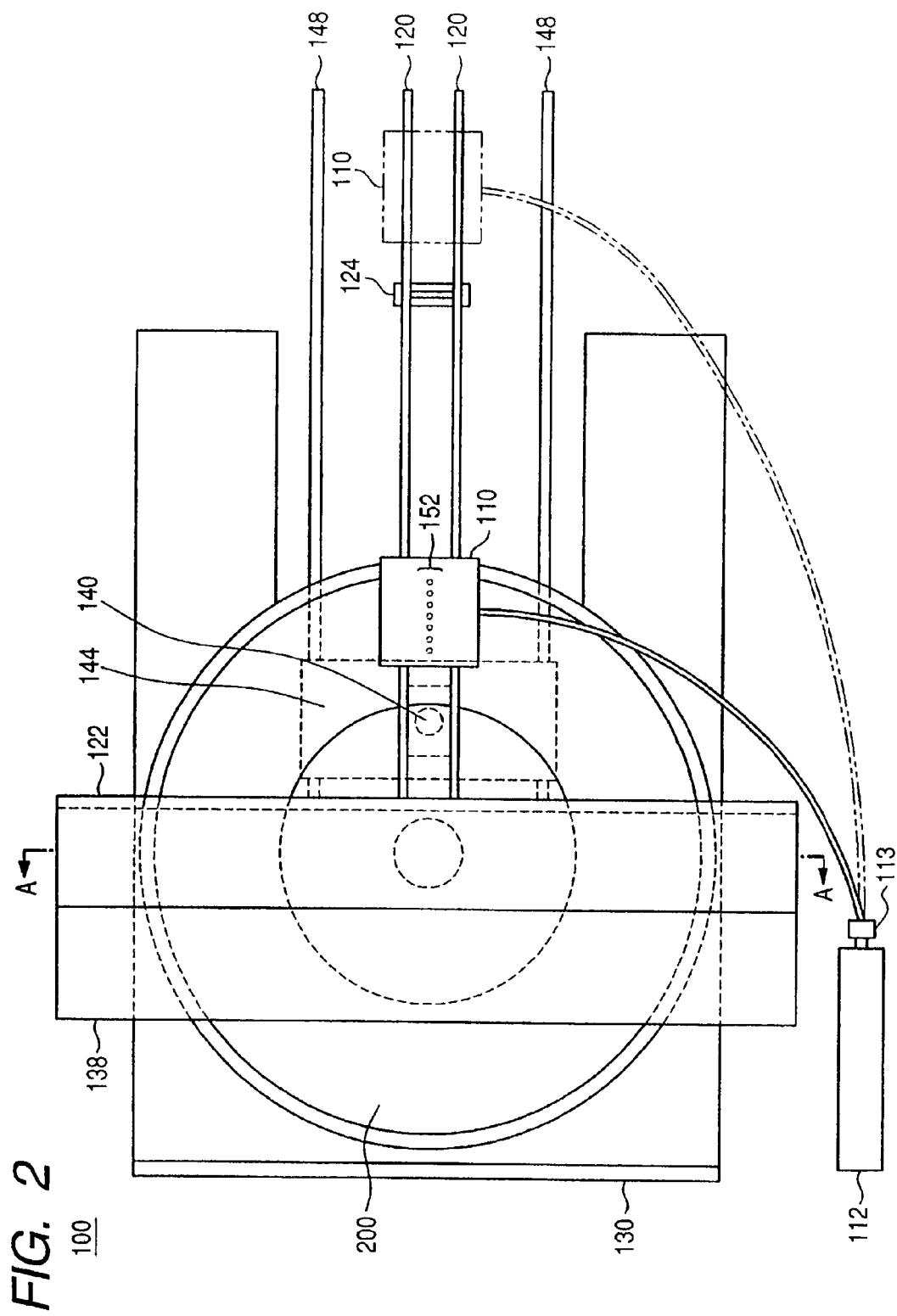
FIG. 2 is a plan view showing the internal configuration of the optical disc apparatus according to the embodiment of the present invention.
Figure 3:
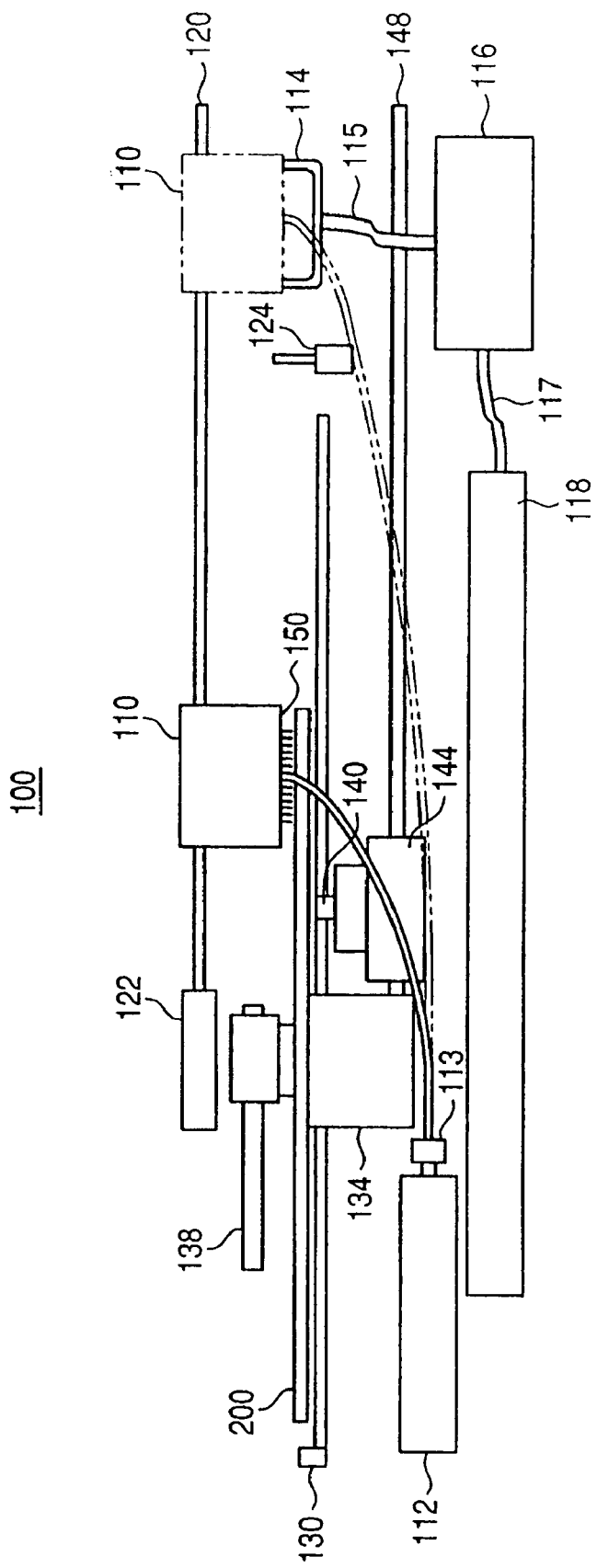
FIG. 3 is a side view showing the internal configuration of the optical disc apparatus according to the embodiment of the present invention.

FIG. 2 is a plan view showing the internal configuration of the optical disc apparatus 100 according to the present embodiment. FIG. 3 is a side view showing the internal configuration of the optical disc apparatus 100 according to the present embodiment.

The optical disc apparatus 100 includes a printing unit for printing label information on a label surface of the optical disc 200 as visible information such as characters or images, and a data processing unit for recording/reproducing a data signal on/from a recording surface of the optical disc 200.

The printing unit includes a print head 110, an ink cartridge 112, a head cap 114, a suction pump 116, a waste ink absorber 118, a first guide shaft 120, a shaft supporting part 122, and a blade 124.

The print head 110 includes a series of nozzles 152 for discharging ink onto a nozzle surface 150 facing the optical disc 200. The nozzles discharge the ink using an inkjet method, for example, with an ink discharge frequency of 8.4 KHz. The inkjet method indicates a method of discharging minute ink droplets from the nozzles 152 to attach the ink to paper.

The print head 110 is moved to the outside of the optical disc 200 in a print standby state and is positioned above the optical disc in a print state. The print head 110 has a function for dummy-discharging the ink before or after printing in order to discharge thickening ink, bubble or extraneous materials from the nozzles.

The ink cartridge 112 includes predetermined colors of ink and supplies the ink to the print head 110. In more detail, the ink cartridge 112 is a container formed of resin and having a tubular shape and includes a porous body such as sponge or ceramic. The ink is collected by a capillary force of the porous body. The ink cartridge 112 supplies the ink to the print head 110 through a connection part 113. Since the ink cartridge 112 can be attached/detached to/from the connection part 113, the ink cartridge 112 can be easily replaced when the ink is used up.

The head cap 114 is mounted on the nozzle surface 150 of the print head 110 in the print standby state such that the ink contained in the print head 110 is prevented from drying and extraneous materials such as dust are prevented from being attached to the nozzle surface 150. In contrast, the head cap 114 is detached from the print head 110 in the printing state. The head cap 114 has a porous layer and has a function for temporarily holding the ink which is dummy-discharged from the print head 110. A valve mechanism (not shown) for adjusting the inner space of the head cap 114 to be in an atmospheric pressure state at the time of the dummy discharge is included.

The suction pump 116 is connected to the head cap 114 through a tube 115 and can suck the ink in the print head 110 by applying a negative voltage to the inner space of the head cap 114 when the head cap 114 is mounted on the print head 110. The suction pump can suck the ink which is dummy-discharged by the print head 110 and temporarily held by the head cap 114.

The waste ink absorber 118 is connected to the suction pump 116 through a tube 117 and discards the ink sucked by the suction pump 116.

The first guide shaft 120 moves the print head 110 in the radial direction of the optical disc 200. This movement may be performed by allowing the first guide shaft 120 to move the print head 110 by a ball screw feed mechanism or by a rack opinion mechanism, a belt feed mechanism, and a wire feed mechanism. The shaft supporting part 122 supports one end of the first guide shaft 120.

The blade 124 is disposed between the print standby position and the print position of the print head 110 and removes the extraneous materials or ink attached to the nozzle surface 150 by wiping out the nozzle surface 150 of the print head 110 when the print head 110 moves from the print standby position to the print position or from the print position to the print stand by position. It may be selected whether the nozzle surface 150 is wiped out by moving the blade 124 upward or downward.

The data processing unit includes the tray 130, a spindle motor 134, a chucking part 138, an optical pickup 140 as a head unit, a moving stand 144, and a second guide shaft 148.

The tray 130 has a shape for mounting the optical disc 200 and can attach/detach the optical disc 200 by the movement of the left and right side of FIG. 2.

The spindle motor 134 rotates on the basis of a control signal received from a motor driving circuit (not shown) and functions as a driver of the optical disc 200. The rotation velocity of the spindle motor 134 may vary depending on whether a data signal process or a label information printing process is performed.

The chucking part 138 contact the upper side of the spindle motor 134. The optical disc 200 mounted in the tray 130 rotates by the rotation of the spindle motor 134 and rises from the tray 130. The chucking part 138 has a function for preventing the optical disc 200 from being separated from the tray 130 due to the rising of the optical disc 200.

The optical pickup 140 is an optical module including a light source, a beam splitter for deflecting the laser light received from the light source, an irradiation part for irradiating the polarized laser light onto the optical disc 200, and a detection part for reading the light reflected from the optical disc 200.

The moving stand 144 mounts the optical pickup 140 and can move by the second guide shaft 148 in the radial direction of the optical disc 200.

Next, the configuration of the optical disc 200 will be described with reference to FIG. 4.

Figure 4:
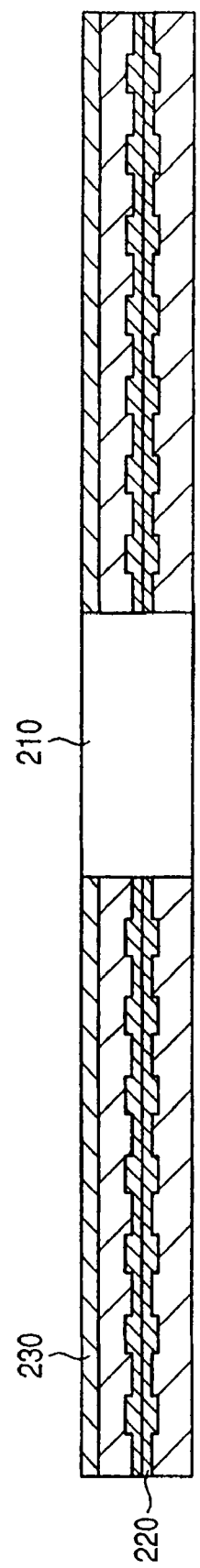
FIG. 4 is a schematic cross-sectional view taken along line A-A of the optical disc shown in FIG. 2.

FIG. 4 is a schematic cross-sectional view taken along line A-A of the optical disc 200 shown in FIG. 2. The optical disc 200 includes a central hole 210, a recording surface 220, and a label surface 230. As the optical disc 200, there are, for example, a CD-R/RW, a recordable DVD (DVD-R/RW/+R/+RW/RAM or the like) and a recordable Blue=ray disc (BD-R/BD-RE).

The central hole 210 is a circular hole for inserting the optical disc 200 into the spindle motor 134 and the chucking part 138. The diameter of the central hole 210 may be about 15 mm to 16 mm.

The recording surface 220 includes a data signal recording region for recording a variety of information as a pit or mark. For example, in a DVD-R, the data signal recording region may be formed by a spiral land groove and a predetermined series of marks are previously recorded and the detailed description thereof will be made later with reference to FIG. 8.

The label surface 230 functions as an ink receiving layer (visible information printing layer) in an inkjet printing process and prints label information such as characters, symbols and photographs. A printable range of the label surface 230 may be in a range of the radius of 20 mm to 57 mm and the width 37 mm of the optical disc 200. The label surface 230 may be configured by additionally adhering printing paper on one surface of the optical disc 200.

Next, the flow of the control of the printing unit and the data processing unit of the optical disc apparatus according to the present embodiment will be described.

Figure 5:
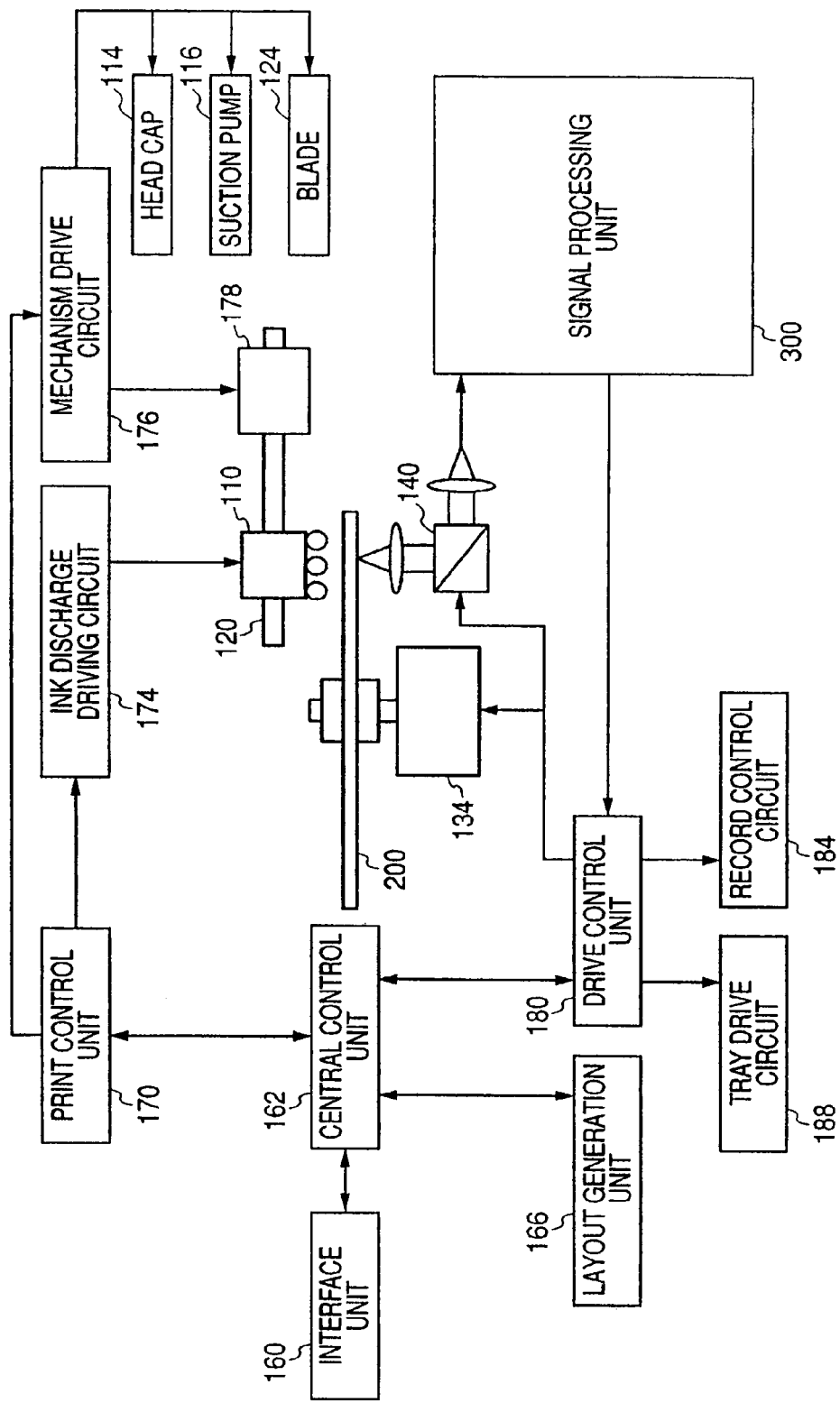
FIG. 5 is a block diagram showing the flow of a signal in the optical disc apparatus according to the embodiment of the present invention.

FIG. 5 is a block diagram showing the flow of a signal in the optical disc apparatus 100 according to the present embodiment. The optical disc apparatus 100 includes an interface unit 160, a central control unit 162, a layout generation unit 166, a print control unit 170, an ink discharge driving circuit 174, a mechanism drive circuit 176, a head driving motor 178, a drive control unit 180, a record control circuit 184, a tray driving circuit 188, and a signal processing unit 300.

The interface unit 160 is a connection part for interchanging a signal between the optical disc apparatus 100 and an external apparatus. The interface unit 160 receives the data signal recorded on the optical disc 200 or the label information printed on the label surface from the external apparatus and outputs them to the central control unit 162. The optical disc apparatus 200 outputs the data signal reproduced from the optical disc 200 to the external apparatus. The external apparatus may include a PC or a DVD recorder for exchanging the data signal or the label information.

The central control unit 162 controls all the components of the optical disc apparatus 100. In particular, the central control unit 162 converts the label information received from the interface unit 160 into a polar coordinate as necessary, outputs the polar coordinate to the print control unit 170, and outputs the data signal to the drive control unit 180, thereby controlling the print control unit 170 and the drive control unit 180. Reference information received from the drive control unit 180 is output to the print control unit.

FIGS. 6A to 6C are views showing a polar coordinate conversion process. First, as shown in FIG. 6A, it is assumed that the label information including string of "ABCDEFGH" is input to the central control unit 162 through the interface unit 160. Then, as shown in FIG. 6B, the central control unit 162 deploys the image of the string "ABCDEFGH" on a memory (not shown) as data of an X-Y coordinate system. As shown in FIG. 6C, the central control unit 162 calculates the radius r from the rotation center of the optical disc 200 for each pixel for configuring the image deployed on the X-Y coordinate system and computes an angle θ on the basis of the original point of the rotation angle, thereby converting the label information to the polar coordinate system. The label information converted into the polar coordinate system is temporarily held in the central control unit 162. The original point of the rotation angle can be detected by the below-described rotation angle information (positional information).

By this configuration, the label information including the string or image can be printed on the optical disc 200 without causing the problem that the label information is printed in an arc shape or a crooked shape.

The layout generation unit 166 generates the layout of the label information to be printed on the basis of printing data on the print situation of the label surface of the optical disc 200 read from the optical disc 200.

The print control unit 170 outputs a signal for controlling the printing of the label information to the ink discharge driving circuit 104 and the mechanism drive circuit 176, on the basis of the input of the label information and the rotation angle information from the central control unit 162. For example, the print control unit 170 determines whether the discharge of the ink from the print head 110 is performed according to the distance in the radial direction and the rotation angle and instructs the ink discharge driving circuit 174 to discharge the ink when it is determined that the discharge of the ink is performed.

The ink discharge driving circuit 174 drives the print head 110 and discharges the ink onto the mounted optical disc 200. For example, the ink discharge driving circuit 174 is a pair of electrodes provided in the print head 110 and a potential difference occurs between the pair of electrodes on the basis of the signal input from the print control unit 170. Then, the pair of electrodes is deformed and an ink tank (not shown) for holding the ink of the print head 110 is pressed, thereby discharging the ink. In the shown example, the ink is shown in a droplet shape on the nozzle surface of the print head 110. Alternatively, the ink discharge driving circuit 174 may be configured by a method of using the expansion of the ink due to heat.

The mechanism drive circuit 176 drives the head cap 114, the suction pump 116, the blade 124, and the head driving motor 178. The head driving motor 178 may be a motor for rotating the first shaft 120 and moving the print head 110 in the radial direction of the optical disc 200.

Now, a division recording method, a multi-path recording method and a print concentration correcting method of the label information performed by the print control unit 170 will be briefly described.

The division recording method indicates a method of shifting the phase of the ink discharge whenever the optical disc 200 rotates once to perform the printing operation. For example, it is assumed that the phase of the ink discharge is shifted by ¼ whenever the optical disc 200 rotates once and the optical disc 200 rotates four times at the same distance in the radial direction. Then, the interval between the discharged inks (dot pitch) is equal to that when the ink discharge frequency is set to four times and thus the label information can be printed with high precision.

The multi-path recording method indicates a method of shifting the phase of the ink discharge and moving the print head 110 in the radial direction of the optical disc 200 when the optical disc 200 rotates once to perform the printing operation, as described in the division recording method. For example, 320 nozzles are arranged on the print head 110 at an interval of 0.0423 mm in the substantially radial direction of the optical disc 200 and the printable range of the label information is in a range of the width of 37 mm of the radius of 20 mm to 57 mm of the optical disc 200.

The printing operation is performed while the phase of the ink discharge is shifted by ¼ and the print head 110 is moved by ¼ head (3.384 mm) in the radial direction of the optical disc 200 whenever the optical disc 200 rotates, and the printing operation is completed when the optical disc 200 rotates fourteen times. According to the multi-path recording method, it is possible to reduce a variation in ink discharge amount of each nozzle to improve print quality.

The print concentration correcting method indicates a method of equalizing the dot pitch of the ink in the whole print region of the optical disc 200. When the printing operation is performed at a constant angular velocity and ink discharge frequency of the optical disc 200, the dot pitch is proportional to the distance in the radial direction of the printing position and thus a difference in dot pitch occurs between the inner and outer circumferences. For example, if it is assumed that the printable range of the label information is in a range of the width of 37 mm of the radius of 20 mm to 57 mm of the optical disc 200 and the ink discharge frequency is 8.4 KHz, the dot pitch is 0.0423 mm at the position of the radius of 57 mm of an outermost circumference, but the dot pitch is 0.0148 mm at the position of the radius of 20 mm of an innermost circumference.

That is, since the dot pitch of the innermost circumference is about one third the dot pitch of the outermost circumference, the print concentration increases three times. The print concentration correcting method is a method of previously correcting the printed label information and preventing the above-described problem. In more detail, when the label information received from the external apparatus is converted into the polar coordinate system, the label information in the inner circumference of the optical disc 200 is thinned out. In the above-described example, the label information is processed such that the number of ink discharges in the innermost circumference becomes 1/3 of the number of ink discharges in the outermost circumference so as to reduce a difference in print concentration between the inner and outer circumferences.

The print concentrations of the inner and outer circumferences of the optical disc 200 can be equalized to some extent by controlling the rotation velocity of the optical disc 200. However, since the print head 110 has a predetermined width, the dot pitch between the nozzles included in the print head 110 varies depending on the distance in the radial direction of the optical disc 200 and thus the difference in print concentration may occur.

The drive control unit 180 controls the rotation of the spindle motor 134 and the optical pickup driving motor (not shown). The drive control unit 180 controls a track servo and a focus servo such that the laser irradiated from the optical pickup traces the track of the optical disc 200, and controls the reproduction or the record of the data signal by the optical pickup 140. The data signal is information read from the series of marks or the pit recorded on the track of the recording surface of the optical disc 200, is not limited to video data or audio data, and may include the below-described printing data.

The record control circuit 184 performs an encoding process or a modulation process of the data signal. The tray driving circuit 188 drives the tray 130 for mounting the optical disc 200.

The spindle motor 134 rotates the optical disc 200 and the optical pickup driving motor moves the position of the optical disc pickup 140 in the radial direction. Hereinafter, the rotation velocity of the optical disc 200 by the spindle motor 134 will be described.

The optical disc 200 generally rotates at about 1000 rpm to several thousands rpm when recording/reproducing the data signal. If the rotation velocity is 3000 rpm, a circumferential velocity is 19 m/s in the outermost circumference of the optical disc 200 having the diameter of 120 mm. The flying velocity of the ink discharge is generally about 5 to 20 m/s. The circumferential velocity indicates the movement velocity of any one point of the optical disc 200 in the circumferential direction of the optical disc 200. The flying velocity indicates an average velocity of the ink when the ink discharged from the nozzle moves from the nozzle by about 1 mm.

Accordingly, in consideration of a variation in arrival position of the ink which occurs by the air flow due to the rotation of the optical disc 200 and a variation in flying velocity between the plurality of nozzles, the circumferential velocity may be set to 2 m/s or less and the rotation velocity may be set to be 320 rpm or less in the rotation in a printing mode for printing the label information of the optical disc 200. In consideration of the influence of a centrifugal force which occurs after the ink arrives at the optical disc 200, it is efficient that the rotation of the optical disc 200 is set to be equal to the circumferential velocity and the rotation velocity.

As another example, it is considered that the flying velocity of the ink is in a range of ±1 m/s of 10 m/s in each nozzle and the distance between the print head 110 and the optical disc 200 is 1 mm. In this case, since the flying time of the ink is in a range of 91 μs to 111 μs, a maximum difference in flying time of the ink between the nozzles is 20 μs. Accordingly, when the ink is discharged on a circumference having a circumferential velocity of 19 m/s, a maximum error in the arrival position of the ink is 384 μm and, when the ink is discharged on the circumference having a circumferential velocity of 2 m/s, a maximum error in the arrival position of the ink is 40 μm. The latter error may not be substantially recognized by naked eyes, but the former error is nine times the latter error and can be recognized by naked eyes.

As described above, when the circumferential velocity of the optical disc 200 is too fast, the error in the arrival position of the ink increases. Accordingly, in the present embodiment, the rotation velocity is separately set in the record of the data signal and the printing of the label information, and the rotation velocity of the optical disc 200 in the printing mode may be set to 238 rpm (the circumferential velocity in the outermost circumference is about 1.4 m/s).

Although the optical disc 200 which is the recording medium rotates by the spindle motor 134 in the optical disc apparatus 100, a record and/or reproduction unit and a printing unit may move by a driver. Since the recording medium is not limited to the optical disc 200, the motion due to the drive of the driver is not limited to a circular motion and may be linear motion.

The signal processing unit 300 processes the demodulation and the error detection and correction of a radio frequency (RF) signal received from the optical pickup 140 and reproduces the data signal or generates a tracking signal.

The signal processing unit 300 detects the reference signal indicating the rotation angle of the optical disc 200 from the recording surface of the optical disc 200 and outputs the reference signal to the drive control unit 180. Hereinafter, the details of the reference signal and the signal processing unit 300 for detecting the reference signal will be described.

In general, the rotation angle of the driving unit driven by a motor is detected by a rotary encoder or a Tachogenerator attached to the motor. However, in the optical disc apparatus 100, since a relationship between the rotation angle of the spindle motor 134 and the rotation angle of the optical disc 200 varies whenever the optical disc 200 is attached/detached, the absolute rotation angle of the optical disc 200 may not be detected by the rotary encoder or the Tachogenerator.

The detection of the absolute rotation angle of the optical disc 200 when printing the label information is particularly important in the follow viewpoint. First, the rotation of the spindle motor 134 and the rotation of the optical disc 200 are not necessarily equal and the print quality is not assured by only printing the label information on the basis of the rotation angle of the spindle motor 134 because the detection precision of the rotation angle is low. Second, when new label information is desired to be additionally printed using the non-print region of the optical disc 200 on which the label information is printed once, the non-print region of the optical disc 200 may not be recognized by the optical disc apparatus 100 and the label information may not be additionally recorded.

According to the embodiment of the present invention, it is possible to provide the optical disc apparatus 100 capable of detecting the absolute rotation angle of the optical disc 200 on the basis of the recording pattern of the data signal on the recording surface of the existing optical disc 200.

Figure 7:
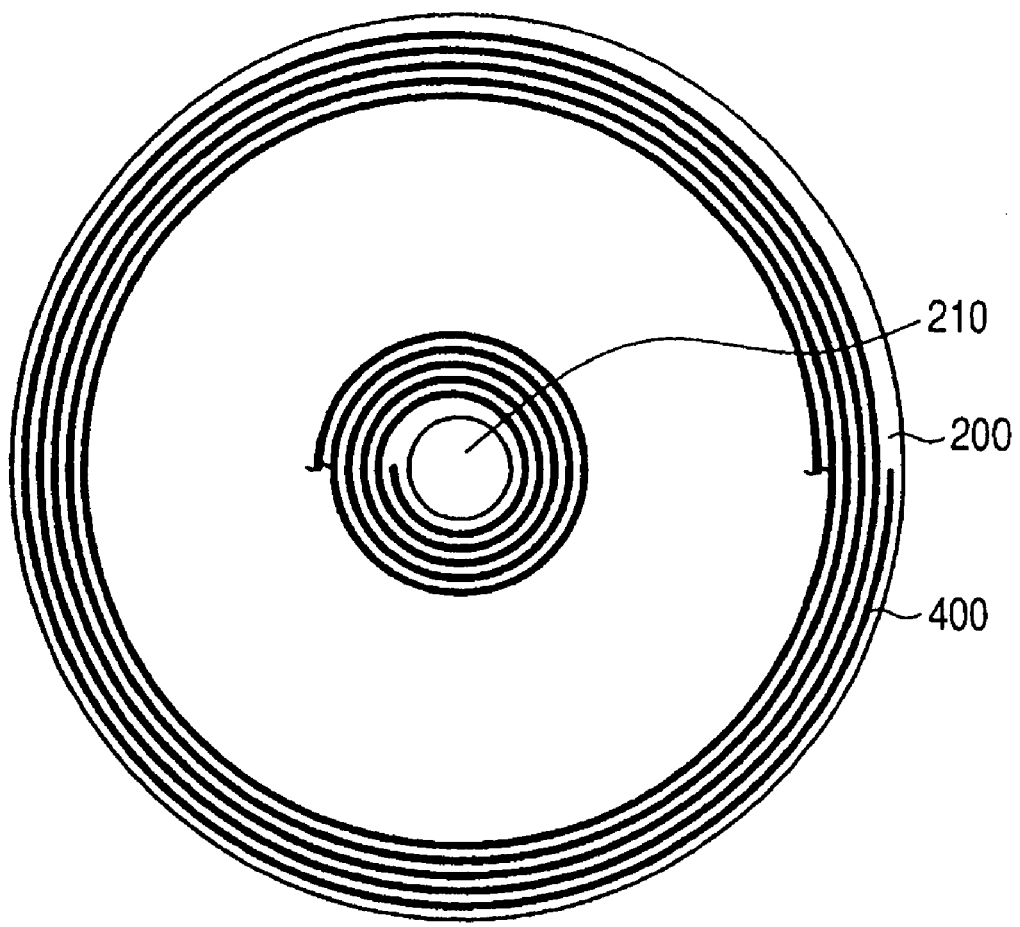
FIG. 7 is a schematic diagram showing the track structure of the recording surface of the optical disc.

FIG. 7 is a schematic diagram showing the track structure of the recording surface of the optical disc 200. As shown, the track 400 of the recording surface 220 of the optical disc 200 is formed in a spiral shape. The optical pickup 140 can trace the track 400 to record or reproduce the data signal.

Figures 8, 9:
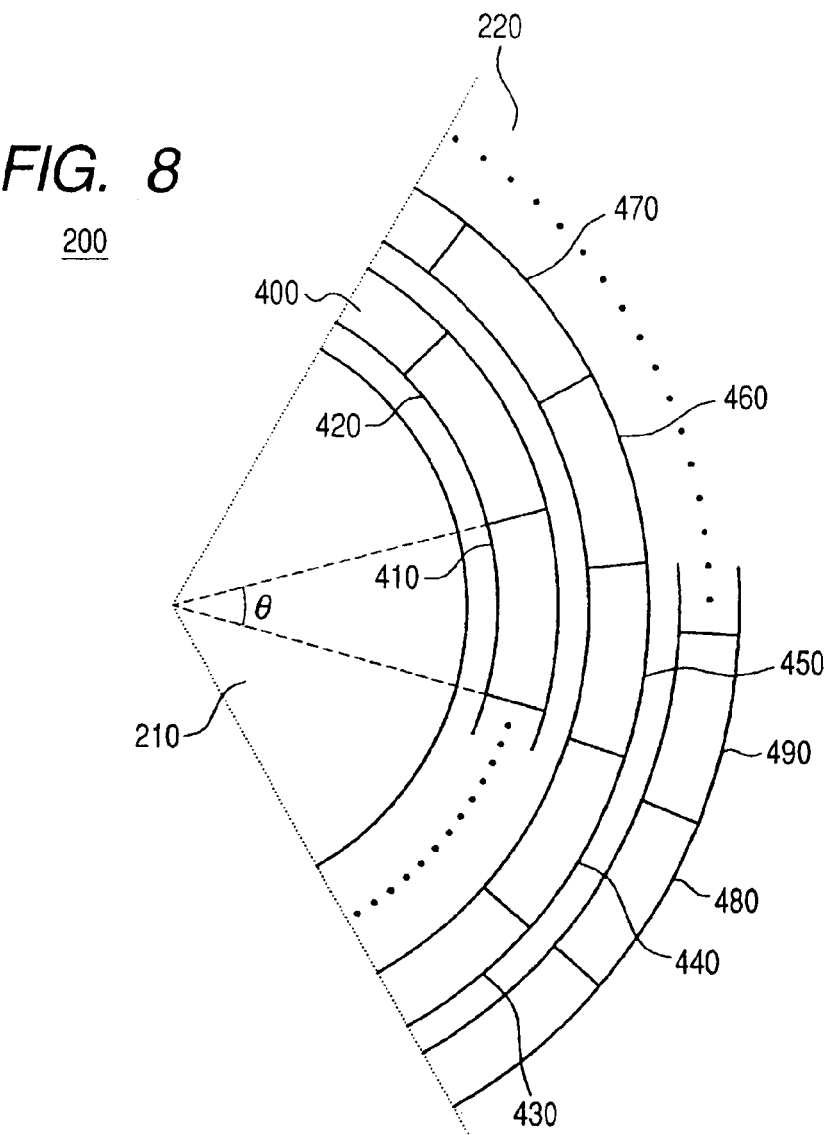
FIG. 8 is a schematic view showing the track structure of the recording surface of the optical disc in more detail.
FIG. 9 is a view showing the structure of each sector configuring the track.

FIG. 8 is a schematic view showing the track structure of the recording surface of the optical disc 200 in more detail. FIG. 9 is a view showing the structure of each sector configuring the track. Hereinafter, the sector structure of the optical disc 200 will be described with reference to FIGS. 8 and 9.

The track 400 includes a plurality of successive sectors and sectors 410 to 490 of the recording surface of the optical disc 200 are shown in the drawing. The sector between the sector 420 and the sector 430 and the sector between the sector 470 and the sector 480 are omitted.

The sectors 410 to 490 include a synchronization pattern (SY0) 411, address information 412, IED information 414, copyright information (CPR-MAI) 416, user data 417, an error detection code (EDC) 418, as shown in FIG. 9.

The synchronization pattern SY0 is 4-byte information recorded on the top of each sector and indicates a start time point of the address information 412. The synchronization patterns SY1 to SY7 are periodically recorded in the respective sectors in order to accurately detect the separation of 16 bits. In FIG. 9, only the synchronization pattern SY0 is shown as the synchronization pattern for clearness of the drawing.

FIG. 10 is a view showing the configuration of the synchronization pattern. There are eight synchronization patterns (synchronization signals) SY0 to SY7 and four types of configurations are prepared in the respective synchronization patterns. The latter half of the synchronization patterns is composed of a combination of 14T and 4T. Since the combination does not appear in the user data 417, the synchronization patterns can be identified.

The address information 412 is 4-byte information recorded in each sector in order to identify each sector. As the address information 412, "030000" is recorded in a hexadecimal form at the start position (radius 24 mm) of the data region of the optical disc 200. As the address information 412, values added with "1" are sequentially recorded in the hexadecimal form in order of the arrangement of the sectors.

The IED information 414 is a 2-byte error detection code which determines whether the address information 412 is accurately detected or a bit error occurs in the address information 412.

The copyright information 416 is information used for inhibiting and restricting illegal copy for the purpose of protecting copyright.

The user data 417 is a 2048-byte region in which a variety of data such as video data or audio data is recorded. The above-described synchronization patterns SY1 to SY7 are periodically recorded and omitted in FIG. 9.

The EDC (Error Detection Code) 418 is 4-byte information for detecting a data error.

In FIG. 8, the sector 410 is a start sector of the above-described data region. Accordingly, the address information 412 is represented with "030000". The address information 412 of the sector 420 after the sector 410 is represented with "030001".

Meanwhile, since the length of each sector is about 5 mm in a DVD, an angular interval θ of the recorded address information 412 is about 12 degrees in the innermost circumference having the radius of 24 mm and including the sectors 410 and 420. Accordingly, since about 30 sectors are included in the track of the innermost circumference having the radius of 24 mm, the address information 412 of the sector 430 is represented with "03001D" and the address information 412 of the sector 440 is represented with "03001E". Thereafter, the address information 412 of the sectors 450 to 490 is represented with the similar method.

Even in the outermost circumference of the optical disc 200, the angular interval θ of each sector is about 5 degrees. Accordingly, the precision (resolution) of the rotation angle is insufficient by only detecting the rotation angle of the optical disc 200 on the basis of the address information.

However, in the optical disc apparatus 100 according to the embodiment of the present invention, it is possible to detect the absolute rotation angle of the optical disc 200 with high precision on the basis of a reproduction clock generated by the data signal read by the optical pickup 140. Hereinafter, the optical disc apparatus 100 according to the present embodiment will be described in detail with reference to FIG. 11.

Figure 11:
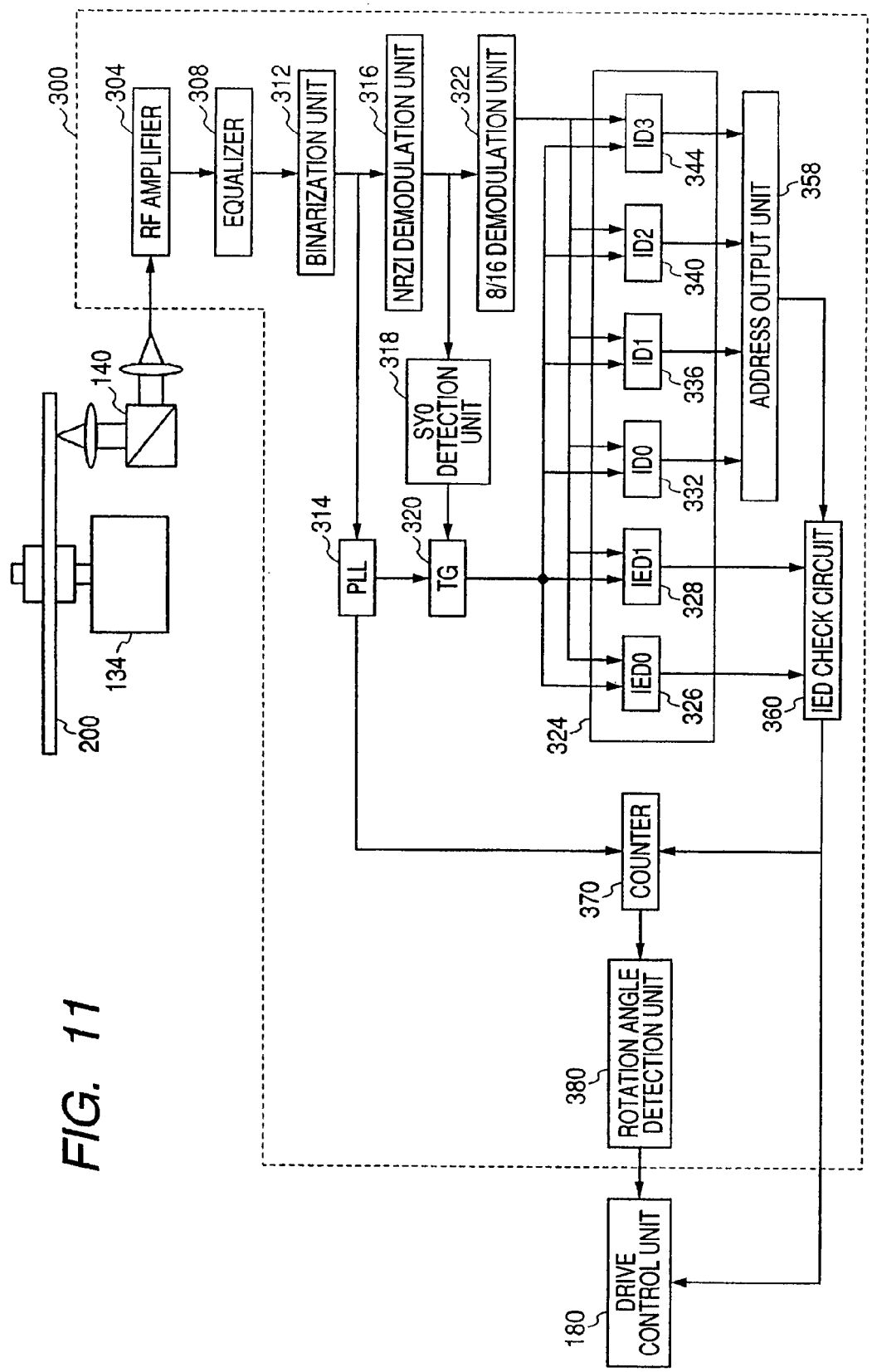
FIG. 11 is a view showing the detailed configuration of a signal processing unit of the optical disc apparatus.

FIG. 11 is a view showing the detailed configuration of the signal processing unit 300 of the optical disc apparatus 100. The signal processing unit 300 includes an RF amplifier 304, an equalizer 308, a binarization unit 312, a phase lock loop (PLL) 314, a non-return-to-zero-inverse (NRZI) demodulation unit 316, a SY0 detection unit 318, a timing generator (TG) 320, a 8/16 demodulation unit 322, a register unit 324, an address output unit 358, an IED check circuit 360, a counter 370, and a rotation angle detection unit 380.

The RF amplifier 304 amplifies a RF signal received from the optical pickup 140 and outputs the amplified signal to the equalizer 308. In more detail, the optical pickup 140 reads the reference signal as the strength of current and the RF amplifier 304 amplifies the strength of the current by current-voltage conversion and outputs the RF signal.

The equalizer 308 emphasizes a high frequency component, which deteriorates by the property of reading the signal by the optical pickup 140, in the RF signal received from the RF amplifier 304.

The binarization unit 312 quantizes the RF signal received from the equalizer 308 into "1" or "0" and outputs a binarized RF signal. The binarization unit 312 may be a comparator.

The PLL 314 may generate the reproduction clock on the basis of the binarized RF signal received from the binarization unit 312 and more particularly the synchronization signal included in the binarized RF signal. The generated reproduction clock is output to the timing generator 320 or the counter 370. The reproduction clock is information which is generated at an interval of 135 nm in the format of a DVD-R. Accordingly, the counter 370 counts the reproduction clock such that the rotation angle of the optical disc 200 can be detected by the rotation angle corresponding to an arc length of about 135 nm.

The NRZI demodulation unit 316 performs NRZI (Non-Return-to-Zero-Inverse) demodulation of the binarized RF signal. In particular, when the value of the received binarized RF signal transitions, a signal having a first level is output and, when the value of the binarized RF signal is maintained, a signal having a second level is output.

The SY0 detection unit 318 outputs a synchronization pattern SY0 detection signal to the timing generator (TG) 320 when a signal corresponding to the synchronization pattern SY0 (any one of the four patterns shown in FIG. 10) is detected from the output of the NRZI demodulation unit 316.

The timing generator 320 generates a timing pulse used in the register unit 324 on the basis of the input time point of the synchronization pattern SY0 detection signal.

The 8/16 demodulation unit 322 stores the output of the NRZI demodulation unit 316 by 16 bits and converts the 16-bit output into 8-bit data by a predetermined 8/16 demodulation method.

The register unit 324 includes an IED0 register 326, an IED1 register 324, an ID0 register 332, an ID1 register 336, an ID2 register 340, and an ID3 register 344 and stores the output from the 8/16 demodulation unit 322 in the respective registers on the basis of the timing pulse received from the timing generator 320. The register unit 324 functions as an address detection unit.

In particular, 1 byte of the top of the IED information 414 is stored in the IED0 register 326 and a next 1 byte is stored in the IED1 register 328. In addition, 1 byte of the top of the address information 412 is stored in the ID0 register 332, a next 1 byte is stored in the ID1 register 336, a next 1 byte is stored in the ID2 register 340, and a last 1 byte is stored in the ID3 register 344. The registers 324 to 356 update the respective stored values when the timing pulse is input.

The values stored in the ID0 register 332 to ID3 register 344 are related to the address information 412 and are output to the drive control unit 180 through the address output unit 358. The drive control unit 180 receives the address information 412 and confirms the sector position of the laser irradiated by the optical pickup.

The IED check circuit 360 determines whether the IED information 414 is right on the basis of the output of the IED0 register 326, the IED1 register 328 and the address output unit 358 and outputs the address information 412 to the drive control unit and the counter 370 if it is determined that the IED information is right.

The counter 370 counts the pulse number of the reproduction clock received from the PLL 314 and outputs the count value to the rotation angle detection unit 380 when receiving the predetermined address information 412 from the IED check circuit 360.

The rotation angle detection unit 380 detects the rotation angle of the optical disc 200 on the basis of the count value received from the counter 370 and outputs the rotation angle to the drive control unit 180, thereby functioning as the position detection unit. As an example, when the predetermined address information is "030000", the counter 370 starts the count of the reproduction clock at a time point when the optical pickup 140 reads the data of the sector 410 shown in FIG. 8. By recording the count value of the reproduction clock and the rotation angle of the optical disc 200 in correspondence in the rotation angle detection unit 380, it is possible to detect the rotation angle of the optical disc 200 on the basis of the count value received from the counter 370.

Since the track of the optical disc 200 is formed in the spiral shape, the period of the reproduction clock shortens as the radial position of the optical pickup 140 increases in constant angular velocity (CAV) control. Accordingly, the count value of the reproduction clock and the rotation angle of the optical disc 200 may be in correspondence with each other in consideration of a variation in period of the reproduction clock.

Figure 12:
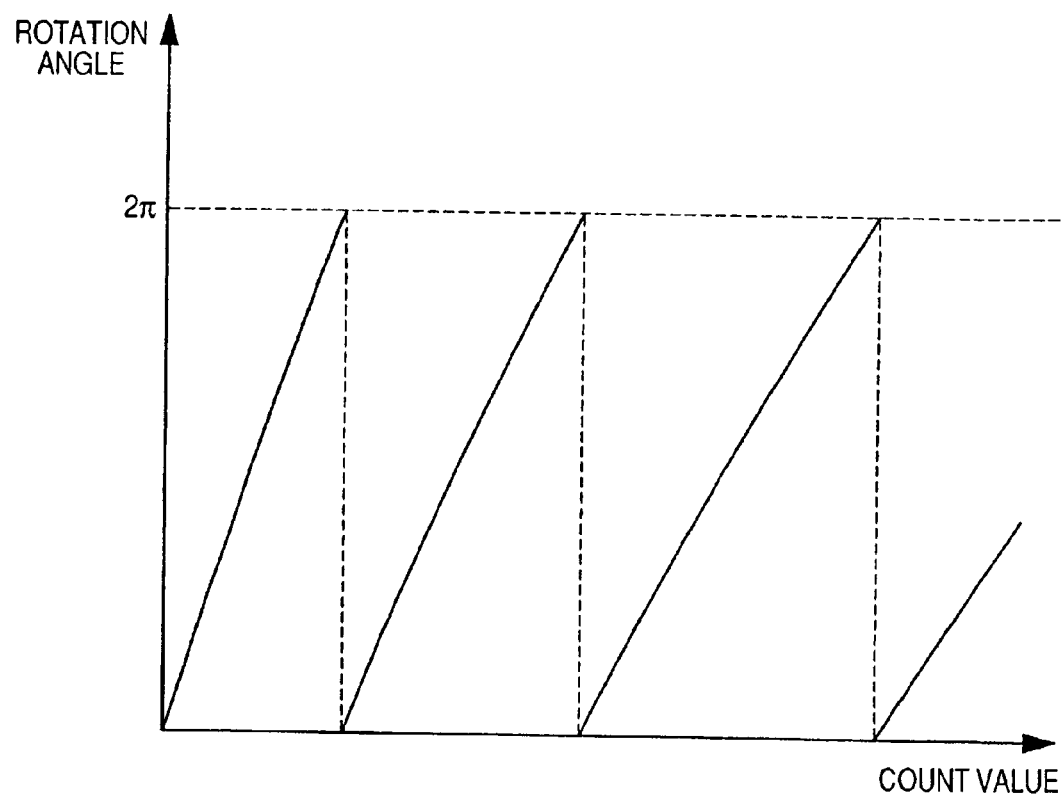
FIG. 12 is a view showing an example of a relationship between the count value of a counter and the rotation angle of the optical disc.

FIG. 12 is a view showing an example of a relationship between the count value of the counter and the rotation angle of the optical disc 200. A horizontal axis indicates the count value of the counter and a vertical axis indicates the rotation angle of the optical disc 200.

The rotation angle of the optical disc 200 which rotates by one pulse of the reproduction clock decreases as the radial position of the optical pickup 140 lengthens. Accordingly, as shown in FIG. 12, the gradient of the graph may be slow as the count value increases. In the format of the DVD-R, since the track pitch is approximately 0.74 µm, a variation in gradient of the graph is slightly exaggerated.

Next, the operation of the signal processing unit 300 will be described.

Figure 13:
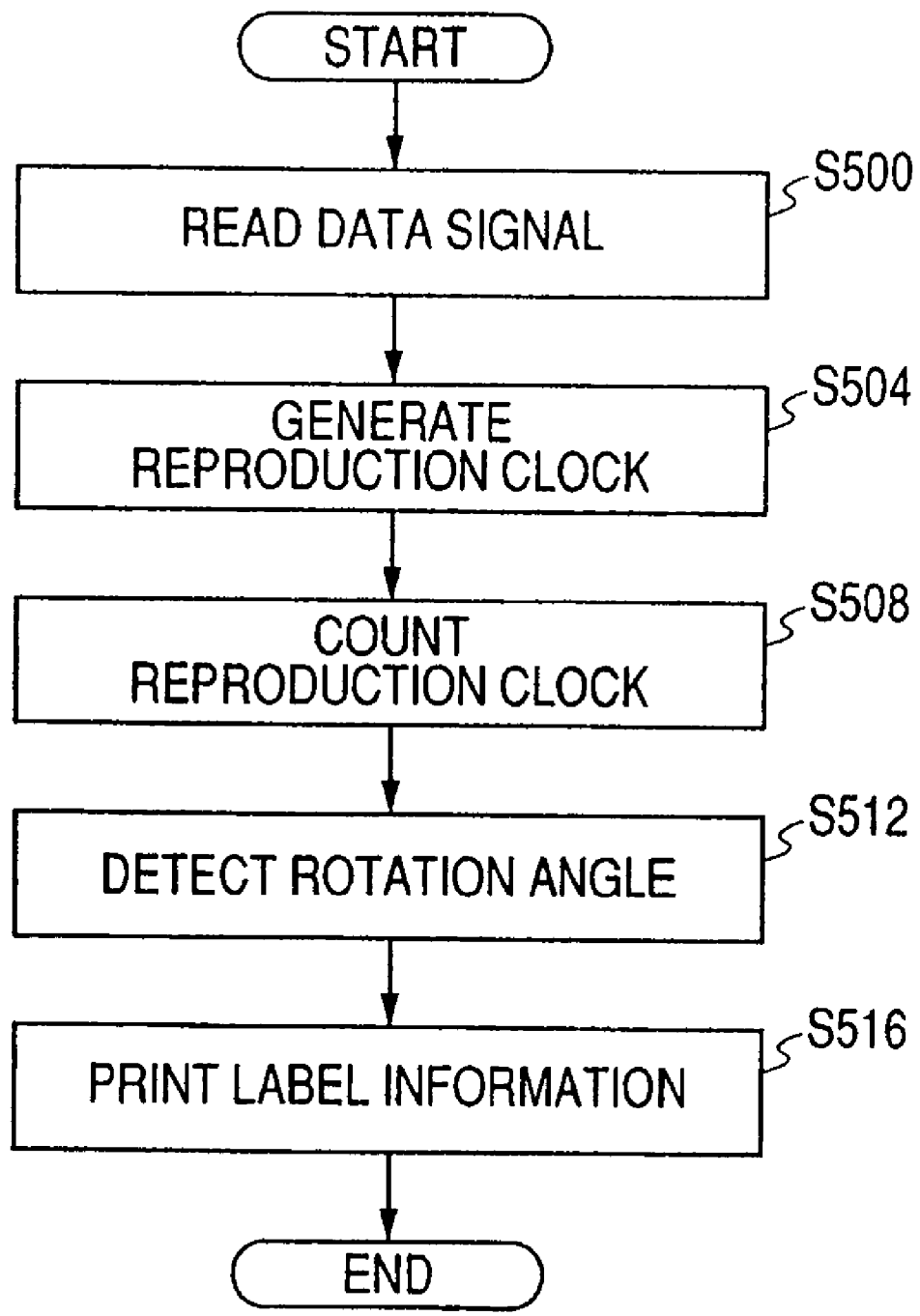
FIG. 13 is a flowchart illustrating the flow of the operation of the signal processing unit.

FIG. 13 is a flowchart illustrating the flow of the operation of the signal processing unit 300. The signal processing unit 300 generates the reproduction clock on the basis of the data signal when the optical pickup 140 reads the data signal (S500 and S504). Subsequently, when the predetermined address information is detected, the pulse number of the reproduction clock is counted (S508). The rotation angle of the optical disc 200 is detected on the count value (S512) and the label information is printed by the printing unit (S516). In particular, the print control unit 170 controls the discharge of the ink according to the rotation angle and the radial position of the print head 110 such that it is possible to print the label information on the label surface of the optical disc 200 with high precision.

The entire flow of the operation of the above-described optical disc apparatus 100 will be described.

Figure 14:
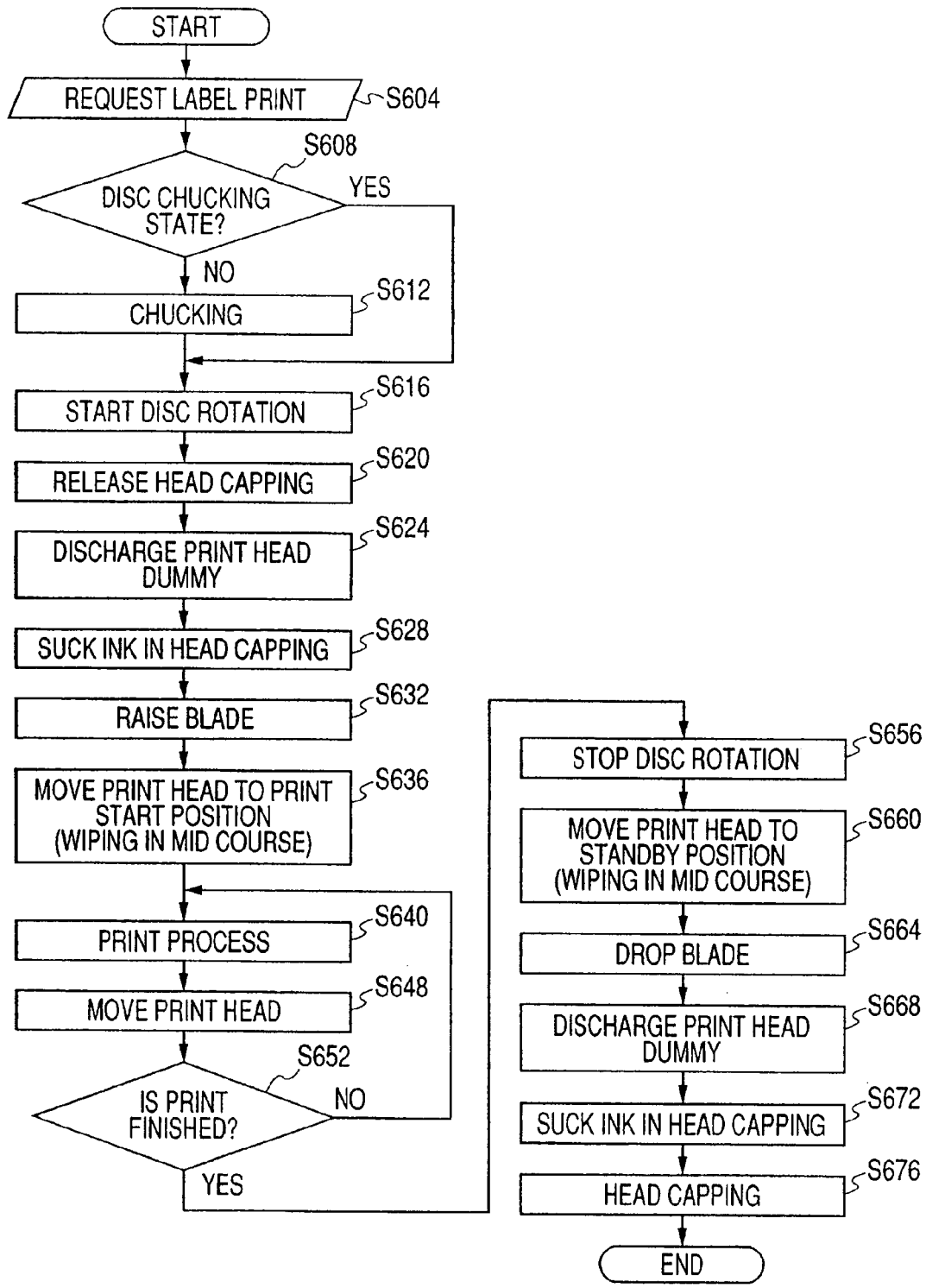
FIG. 14 is a flowchart illustrating the entire flow of the operation of the optical disc apparatus.

FIG. 14 is a flowchart illustrating the entire flow of the operation of the optical disc apparatus 100. First, when the optical disc apparatus 100 is requested to print the label information, it is determined whether the optical disc 200 is chucked (S604 and S608). If it is determined that the optical disc 200 is not chucked, the chucking unit 138 chucks the optical disc 200 (S612).

If it is determined that the optical disc 200 is chucked in the step S608 and if the optical disc 200 is chucked in the step S612, the spindle motor 134 starts the rotation of the optical disc 200 (S616). The inside of the head cap 114 mounted in the print head 110 is brought into an atmospheric pressure (S620), and the dummy discharge of the ink is performed by the print head 110 (S624). Next, the suction pump 116 sucks the ink dummy-discharged by the print head 110 of the head cap 114 (S628) and the blade 124 moves to the position which wipes out the nozzle surface of the print head 110 (S632).

The print head 110 moves to a print start position and the blade 124 wipes out the nozzle surface 150 of the print head 110 during the movement process (S636). Next, a printing process based on the detection of the rotation angle of the above-described signal processing unit 300 is performed (S640) and the print head 110 moves in the radial direction of the optical disc 200 (S648). It is determined whether the printing operation of the label information is completed (S652) and the rotation of the optical disc 200 stops if it is determined that the printing operation of the label information is completed (S656). If it is determined that the printing operation of the label information is not completed, the process returns to the step S640 and the printing operation of the label information is continuously performed.

Next, the print head 110 moves to the print standby position and the blade 124 wipes out the nozzle surface 150 of the print head 110 during the movement process (S660). The blade 124 moves to the standby position (S664) and the print head 110 performs the dummy discharge of the ink (S668). Next, the suction pump 116 sucks the ink dummy-discharged by the print head 110 of the head cap 114 (S676) and the head cap 114 is mounted in the nozzle surface 150 of the print head 110 (S646).

The form of the label information printed by the optical disc apparatus 100 can be freely set.

Figure 15A:
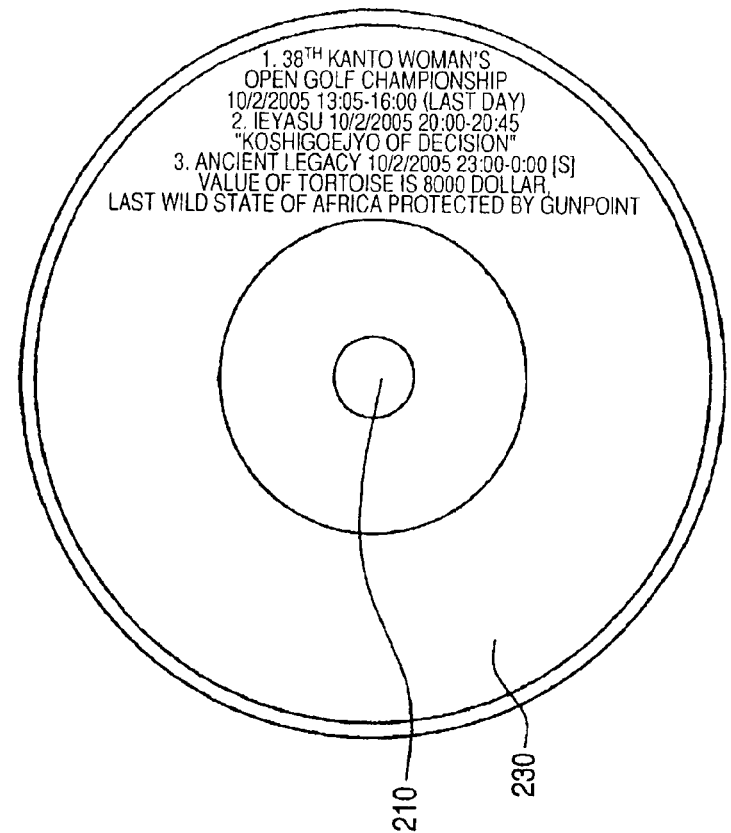
FIGS. 15A and 15B are views showing an example of label information printed on a label surface of the optical disc.
Figure 15B:
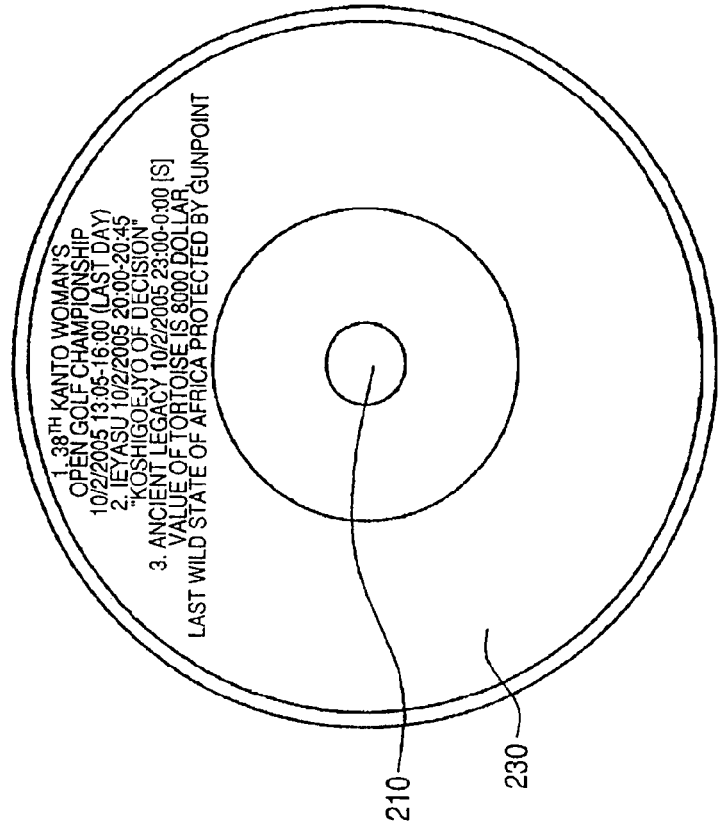

FIGS. 15A and 15B are views showing an example of the label information printed on the label surface of the optical disc 200. The label information may include a program name, a broadcasting date and time, and a title. The label information may further include an image such as a picture or a photograph indicating the contents of the program.

FIG. 15A shows an example of horizontally writing the label information on the label surface of the optical disc 200 and FIG. 15B shows an example of vertically writing the label information on the label surface of the optical disc 200. The printing form is not limited to this and may be a variety of forms such as a circumferential direction or a spiral shape. The item of the printed label information, the size of characters and the font of the characters can be appropriately selected.

As described above, the optical disc apparatus 100 according to the present embodiment can print the label information while detecting the absolute rotation angle of the optical disc 200 in real time. Since the print position of the label information on the optical disc 200 can be specified, it is possible to additionally print the label information in the non-print region of the optical disc 200 by recording the print position of the label information on the recording surface of the optical disc 200 or an external storage device.

In the present embodiment, the signal processing unit can use the series of pits or marks recorded on a general DVD disc without alteration. Accordingly, it is possible to cheaply use as the optical disk 200 an additional writing type DVD disc, which is available commercially, without alteration.

Second Embodiment

Next, an optical disc apparatus 100 according to a second embodiment of the present invention will be described.

The optical disc apparatus 100 according to the present embodiment is different from the optical disc apparatus 100 according to the first embodiment in that the rotation angle of an optical disc 200 is detected in a state that the radial position of an optical pickup 140 is maintained to be substantially uniform.

Figure 16:
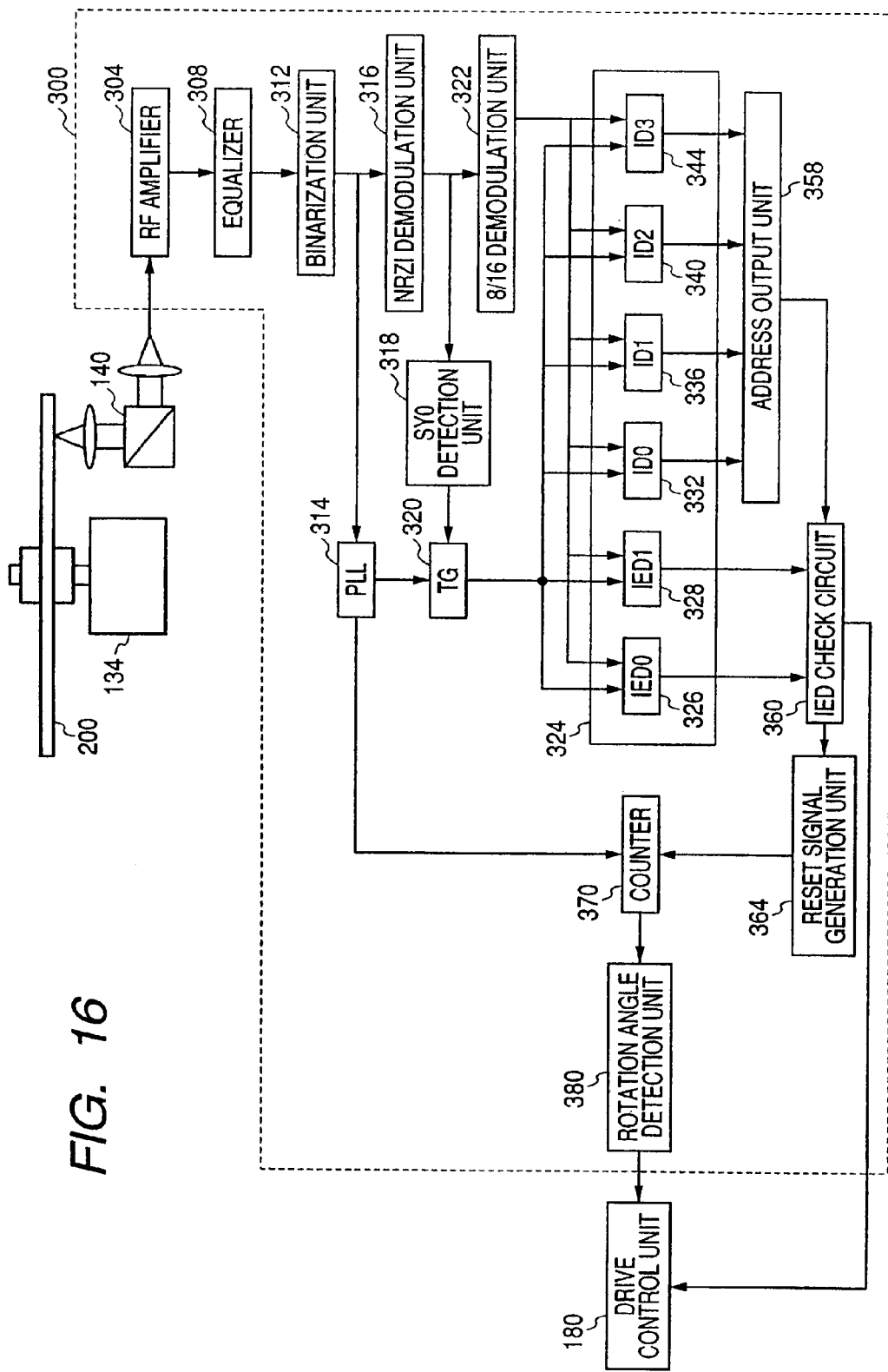
FIG. 16 is a view showing the configuration of the signal processing unit of an optical disc apparatus according to another embodiment of the present invention.

FIG. 16 is a view showing the configuration of a signal processing unit 300 of an optical disc apparatus 100 according to the present embodiment. The signal processing unit 300 includes an RF amplifier 304, an equalizer 308, a binarization unit 312, a phase lock loop (PLL) 314, a non-return-to-zero-inverse (NRZI) demodulation unit 316, a SY0 detection unit 318, a timing generator (TG) 320, a 8/16 demodulation unit 322, a register unit 324, an address output unit 358, an IED check circuit 360, a reset signal generation unit 364, a counter 370, and a rotation angle detection unit 380.

The configuration and operation of the RF amplifier 304, the equalizer 308, the binarization unit 312, the PLL 314, the NRZI demodulation unit 316, the 8/16 demodulation unit 322, the register unit 324, the SY0 detection unit 318, the timing generator (TG) 320, and the address output unit 358 are substantially equal to those of the optical disc apparatus 100 described in the first embodiment and thus the description thereof will be omitted.

The IED check circuit 360 determines whether the IED information 414 is right on the basis of the output of an IED0 register 326, an IED1 register 328 and the address output unit 358 and instructs the reset signal generation unit 364 to generate a rest signal when the IED information 414 is right and the address information 412 determined by the output of the address output unit 358 is a predetermined value.

The reset signal generation unit 364 generates the reset signal for resetting the count value of the counter 370 when receiving the instruction for generating the reset signal from the IED check circuit 360 and outputs the reset signal to the counter 370.

The counter 370 counts the pulse number of the reproduction clock received from the PLL 314. The counter 370 resets the count value up to that time when receiving the reset signal. The rotation angle detection unit 380 detects the rotation angle of the optical disc 200 on the basis of the count value received from the counter 370.

Meanwhile, a drive control unit allows the optical pickup 140 to jump to a track located at an inner circumference if it is determined that the optical pickup reaches a predetermined jump position on the basis of the input of the address information of the IED check circuit. By this configuration, it is possible to detect the rotation angle of the optical disc 200 in a state that the radial position of the optical pickup 140 is maintained to be substantially uniform.

As an example, when the address information "030000" of the sector 410 shown in FIG. 8 is detected, the reset signal generation unit 364 resets the count value of the counter and, when the address information "03001D" of the sector 430 is detected, the optical pickup 140 may jump to the track located at the inner circumference. In this case, the laser irradiation position of the optical pickup 140 is maintained within a region having a radius of about 24 mm and the address information "030000" to "03001D" is repeatedly detected.

Next, the flow of the operation of the signal processing unit 300 according to the present embodiment will be described.

Figure 17:
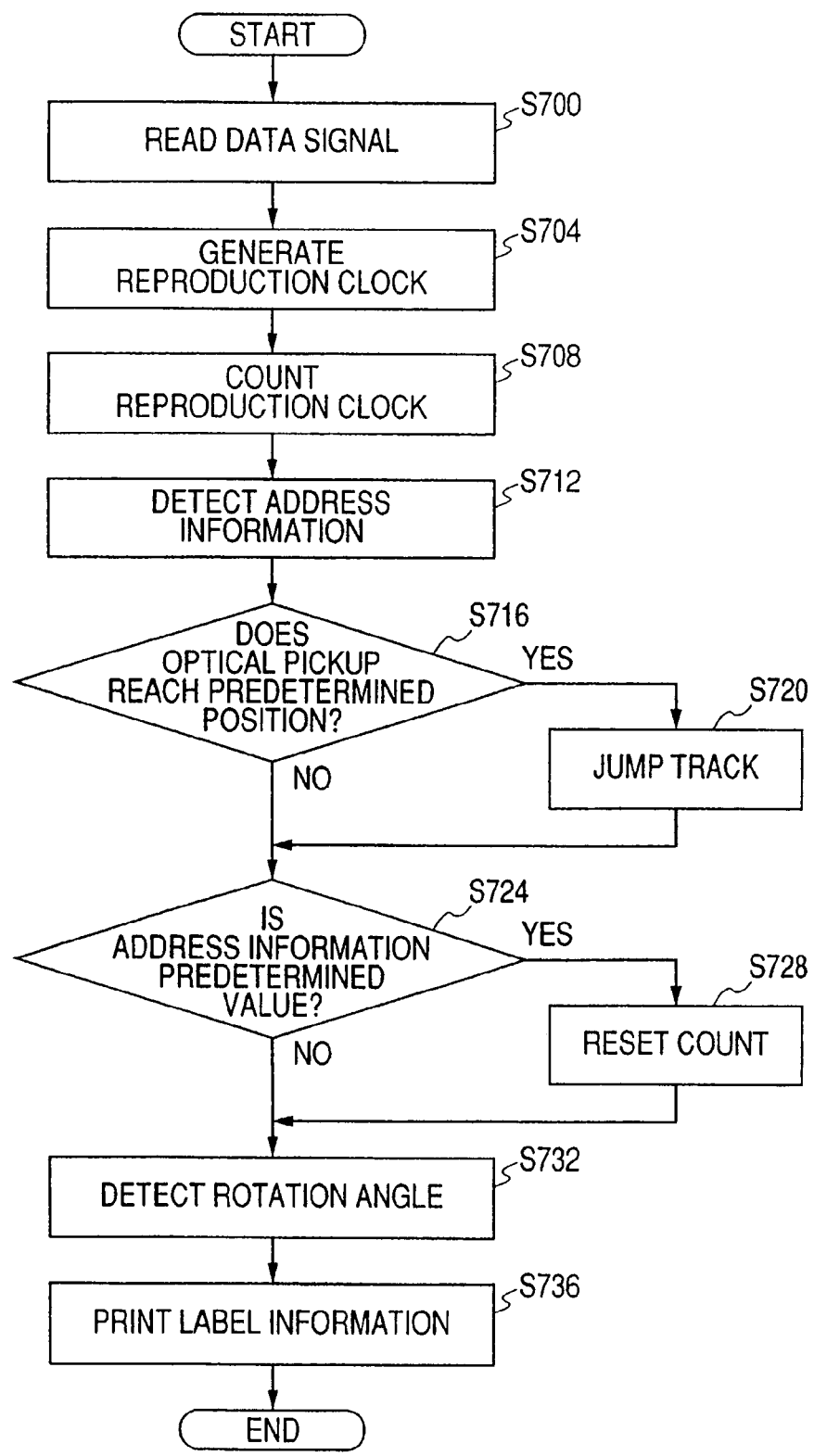
FIG. 17 is a flowchart illustrating the flow of the operation of the signal processing unit.

FIG. 17 is a flowchart illustrating the flow of the operation of the signal processing unit 300. The signal processing unit 300 generates the reproduction clock on the basis of the data signal when the optical pickup 140 reads the data signal (S700 and S704). Subsequently, the pulse number of the reproduction clock is counted by the counter 370 (S708). The address information is detected (S712) and it is determined whether the optical pickup 140 reaches the predetermined position on the basis of the address information (S716). If it is determined that the optical pickup 140 reaches the predetermined position, the optical pickup 140 jumps to the track located at the inner circumference of the optical disc 200 (S720).

If it is determined that the optical pickup 140 does not reach the predetermined position in the step S716 or if the step S720 is performed, it is determined whether the address information is a predetermined value (S724). When it is determined that the address information is the predetermined value, the count value of the counter 370 is reset (S728)

If it is determined that the address information is not the predetermined value in the step S724 or if the step S728 is performed, the rotation angle is detected on the basis of the count value of the counter (S732). Finally, the printing unit prints the label information on the basis of the rotation angle (S736).

The optical disc apparatus 100 according to the present embodiment can position the optical pickup 140 in the substantially same radial position. Accordingly, it is possible to detect the rotation angle of the optical disc 200 on the basis of the substantially uniform reproduction clock, while being not influenced by a variation in period of the reproduction clock due to the radial position of the optical disc 200.

Although the embodiments of the present invention are described with reference to the attached drawings, the present invention is not limited to the embodiments. It will be understood by those skilled in the art that various modified embodiments or changed embodiments may be made therein without departing from the spirit and scope of the invention as defined by the appended claims.

For example, in the second embodiment, the timing of resetting the count value of the counter 370 and the timing of the track jumping of the optical pickup are not limited to the above-described embodiment and the resetting of the count value and the track jumping of the optical pickup may be performed on the basis of the address information detected on the track of a outermost circumferential portion or a middle portion. In order to obtain a clock signal, a case where the data region is a non-record region is considered. In this case, the wobble (meandering) information of a pre-groove which is previously recorded on the optical disc 200 may be detected to detect the reproduction clock and the address information.

In the second embodiment, a case where the reproduction clock is distorted at the time of the track jumping of the optical pickup 140 may be considered. Accordingly, in a predetermined time period after starting the track jumping of the optical pickup 140, for example, in a time period until the counter 370 is reset, the phase comparison of the PLL 314 may stop and the normal output of the reproduction clock up to that time may be maintained.

Alternatively, the PLL may detect the period of the synchronization signal included in the data signal and the generation of the reproduction clock which was generated up to that time may be maintained in the time period when the period of the synchronization signal is determined to be abnormal. For example, when the period increases/decreases by 30% or more of an average period of the synchronization signal corresponding to 10 pulses, it may be determined that the period of the synchronization signal is abnormal.

It should be understood by those skilled in the art that various modifications, combinations, sub-combinations and alternations may occur depending on design requirements and other factors insofar as they are within the scope of the appended claims or the equivalents thereof.

What is claimed is:

1. A recording medium processing apparatus comprising:
    a head unit which traces a track formed on a recording surface of a recording medium and reads a data signal;
    a signal processing unit which detects positional information of the recording medium on the basis of the data signal; and
    a printing unit which prints visible information on a non-recording surface of the recording medium by referring to the positional information,
    wherein the signal processing unit includes:
        a clock generation unit which generates a reproduction clock on the basis of the data signal;
        a counter which counts the reproduction clock;
        a position detection unit which detects positional information of the recording medium from the value of the counter;
        an address detection unit which detects address information of physical sectors of the track; and
        a reset signal generation unit which resets the value of the counter when the address information is a predetermined value,
    wherein the head unit further includes a drive control unit which allows the head unit to track jump to an inner circumference side when the head unit reaches a predetermined jump position of the track, and
    wherein the clock generation unit detects the period of a synchronization signal and maintains the generation of the reproduction clock generated up to that time in a period when the synchronization signal is determined to be abnormal.

2. The recording medium processing apparatus according to claim 1, wherein the clock generation unit generates the reproduction clock on the basis of a synchronization signal included in the data signal.

3. The recording medium processing apparatus according to claim 1, wherein the track is formed in a spiral shape and the position detection unit detects the positional information of the recording medium in consideration of a distance in the radial direction of the track traced by the head unit.

4. The recording medium processing apparatus according to claim 1, wherein the clock generation unit maintains the generation of the reproduction of clock generated up to that time in a predetermined period after the head unit starts the track jump.

5. A printing method comprising the steps of:
    at a head unit, tracing a track formed on a recording surface of a recording medium and reading a data signal;
    generating a reproduction clock on the basis of the data signal;
    counting the reproduction clock;
    detecting address information of physical sectors of the track;
    allowing the head unit to track jump to an inner circumference side when the head unit reaches a predetermined jump position;
    resetting the count value when the address information is a predetermined value;
    detecting positional information of the recording medium from the value of the counter;
    detecting the period of a synchronization signal and maintains the generation of the reproduction clock generated up to that time in a period when the synchronization signal is determined to be abnormal; and
    printing visible information on a non-recording surface of the recording medium on the basis of the positional information.

6. A recording medium processing apparatus comprising:
    a head unit which traces a track formed on a recording surface of a recording medium and reads a data signal;
    a clock generation unit which generates a reproduction clock on the basis of the data signal;
    a counter which counts the reproduction clock;
    an address information detection unit which detects address information of physical sectors of the track;
    a drive control unit which allows the head unit to track jump to an inner circumference side when the head unit reaches a predetermined jump position;
    a reset signal generation unit which generates the reset signal which resets the count value when the address information is a predetermined value;
    a position detection unit which detects positional information of the recording medium from the value of the counter; and
    a printing unit which prints visible information on a non-recording surface of the recording medium on the basis of the positional information,
    wherein the clock generation unit detects the period of a synchronization signal and maintains the generation of the reproduction clock generated up to that time in a period when the synchronization signal is determined to be abnormal.

* * * * *